UNITED STATES PATENT OFFICE 2,216,559

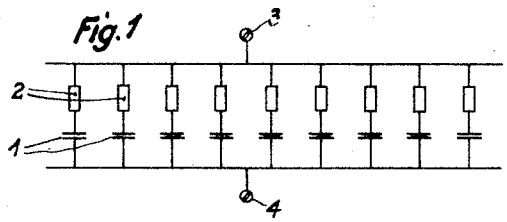
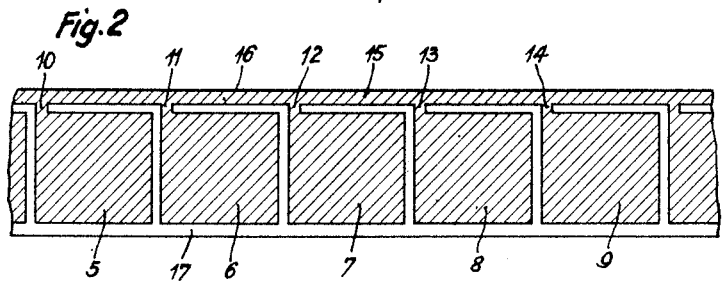
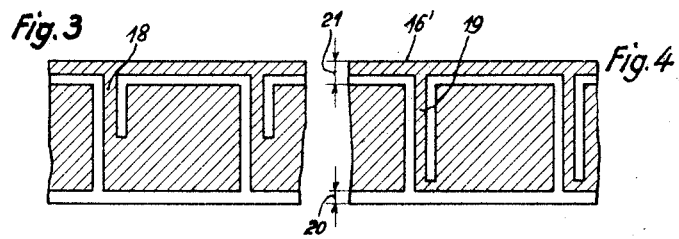
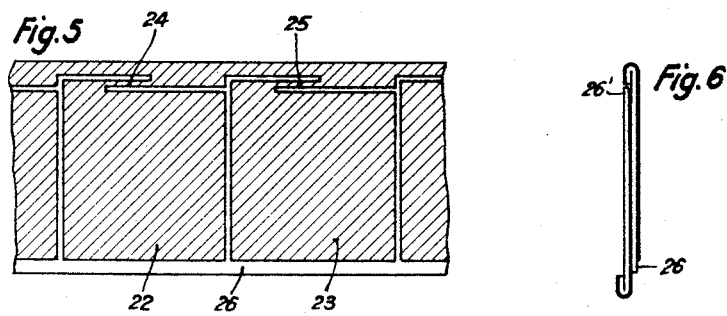

ELECTROSTATIC CONDENSER

Alfred Ortlieb and Hermann Sträb, Stuttgart, Germany, assignors to Robert Bosch Gesellschaft mit beschränkter Haftung, Stuttgart, Germany Application January 17, 1938, Serial No. 185,464
In Germany January 20, 1937

11 Claims. (Cl. 175—41)

It is known that electrostatic condensers become insensitive towards punctures if at least one of their metal coatings is made so thin that, in the event of a puncture, it burns away about the point of puncture under the influence of the short circuit flowing through the point of puncture and thus automatically breaks the short circuit. This effect occurs with metal coatings of which the thickness is smaller than 1 or $2\mu$ particularly with metal coatings of which the thickness is of the order of magnitude of $0.1\mu$.

The applicant has ascertained that, with large capacities it can happen that the metal coating does indeed burn away at a point of puncture, but that here the dielectric also splits and the condenser thus becomes conductive in consequence of mechanical destruction.

The basis of the invention is a recognition that a mechanical destruction of this nature has its origin in the fact that as a result of the large capacity of the condenser, the current output becoming operative at the point of puncture is also very large. This drawback can be removed according to the invention by using for the capacity concerned not a single condenser, but several condensers connected in parallel, between which there are located coupling members. These coupling members can consist either of inductances or of resistances or of a combination of both. Now if a puncture occurs in one of the condensers connected in parallel the energy stored up in the parallel condensers can only flow into a point of puncture comparatively slowly, so that mechanical destruction of the dielectric is avoided.

The division into several condensers connected in parallel may also be effected within a single condenser winding or pack, at least one coating of the condenser being divided into several metal surfaces which are connected with each other through coupling resistances or inductances. In so doing, it is preferable to put the coupling members as well into the winding or pack.

Examples of construction of the invention are shown in the drawing.

Figure 1 shows the connection of several separate condensers used in accordance with the invention.

Figures 2–5 show winding bands provided with a metal coating, which bands serve for the production of condensers according to the invention.

Figure 6 shows a cross-section through two bands which lie one upon the other in the condenser and are constructed according to Figure 5.

Figure 1 shows a connection arrangement in which instead of one large condenser several small condensers 1 are used which are each connected via a resistance 2, with the common current connection terminals 3, 4. For example separate windings each of 0.1 microfarad can be used for this purpose, to each of which is connected a resistance of 100 ohms. If it is desired to obtain a small loss factor for the arrangement, it is preferable to proceed as far as possible with the division, since then, owing to the parallel connection, the ohmic resistance appearing externally becomes very small. In the example given, at 50 Hertz there is a loss factor of 0.3%, which is entirely without importance for most cases.

Figure 2 shows a dielectric band, a paper band for instance, which is metallised at the hatched parts. The metallising is extraordinarily thin. It may, for instance, be between 0.15 and $0.05\mu$ thick. The nonhatched parts are free from metal. Metallising is so arranged that individual separate metal surfaces or plates 5, 6, 7, 8, 9 result. These metal surfaces or plates represent separate condensers connected in parallel. As current leads to the metal surfaces are used the strips 10, 11, 12, 13, 14 which are connected on one hand with the metal surface and on the other hand with a metallised border 15. At 16 the metallising of the border is somewhat thickened and a strip (not visible in the drawing) of the border is folded round for the current connection.

Two bands of this kind are wound together to form a condenser. The second band is used in a reversed position relative to the first band, so that its metallised edge is located on that side on which the first band has its metal-free border 17. On the two front surfaces of the condenser present after winding, a metal coating is sprayed and serves as a current connection surface.

Now if a puncture occurs in this condenser within one of the metal surfaces, for instance within the surface 7, in the first minute a current short circuit flows into the point of puncture almost only from the metal surface 7 and from the metal surface opposite thereto of the other coating on the second band. The currents flowing from the other metal surfaces towards the point of puncture are greatly limited by the ohmic resistance of the strip 12. The flow of energy to the point of puncture is consequently distributed over a fairly long period, within which the thin metal coating burns away about the point of puncture, whereby the short circuit is automatically broken.

The resistance of the strips can be varied by varying their length and breadth, and they can be thus brought to any desired resistance value. Figures 3 and 4 show examples in which the strips 18 and 19 have a considerably greater length than in the construction according to Figure 1. Resistance values in the order of magnitude of 100 ohms are thus comparatively easy to obtain.

In order to insulate the strips against the neighbouring metal surfaces, metal-free strips are necessary. These metal-free strips are, of course, lost for the capacity of the condenser. For this reason, they are preferably kept as small as possible, in which case, of course, their smallest admissible breadth depends on the working voltage of the winding. Especially for windings with medium voltages (i. e. in the neighbourhood of 500 volts) breadths between 0.2 and 0.5 mm. are suitable.

In order to lose as little capacity as possible owing to the strips which remain free, it is to be recommended in all cases to make the metal-free border 20 (see Fig. 4) and the spacing 21 from the edge 16' to the edge of the adjoining capacity surface equal in width. For the breadth of the metal-free border 20 is, of course, lost as well as a capacity surface on both sides. It is thus of advantage under certain circumstances to place the resistance strips in the edge zone free of field. By so doing, there is also obtained the advantage that a puncture does not occur in the resistance strip. A puncture in the resistance strip would have the drawback that a burnt-out spot would occur in the resistance strip, and in certain circumstances, owing to such a burnt-out spot, the metal surface located behind the strip might be disconnected, whereby unnecessary capacity would be lost.

An example of construction in which the resistance strip is located in the zone free of field is shown in Figures 5 and 6. Figure 5 again shows a dielectric band intended for winding, in which the hatched surfaces represent a metallized coating. 22 and 23 denote two separate capacity surfaces and 24 and 25 denote the resistance strips belonging to them. 26 is the metal-free border of the dielectric.

Figure 6 shows the metallised dielectric band in Figure 5 in section and together with a second correspondingly metallized dielectric band in the position used in winding, in which position the metal-free border 26 of one band is located on the side opposed to the metallized border 26' of the other band. In comparison with Figure 4 it can clearly be seen that the bars 24 and 25 come at points at which the metal-free border of the other band is opposite to them, so that an electric field cannot be formed here.

The bands of dielectric shown in the examples of construction can be metallised in a simple manner by printing the metal coating, with the outlines which are perhaps somewhat complicated in appearance, on to the dielectric. However, the shape of the metal-free surfaces can also be printed in a material which does not take on the metal coating or to which it does not adhere, so that it can be wiped away again afterwards. If the dielectric is metallised in vacuo, for instance by thermal vaporisation or by cathode sputtering, then the shape of the metal-free surfaces can be printed with grease or oil. These parts then do not take on any metal during metallizing.

We declare, that what we claim is:

1. An electrical condenser comprising a dielectric, and a metal coating, so thin that it burns away in the neighborhood of a puncture, applied thereto, said metal coating providing a plurality of coated portions forming separate metal surfaces or plates, a coated portion forming a current connection and a plurality of coated portions forming resistances connecting the separate metal surfaces or plates in parallel to said current connection.

2. An electrical condenser comprising a dielectric and a metal coating, so thin that it burns away in the neighborhood of a puncture, applied thereto, said metal coating providing a plurality of metal coated portions separated by uncoated portions and forming a plurality of condenser plates, a coated portion to provide a current connection strip, and a plurality of coated portions forming resistance strips connecting said plates in parallel to said current connection strip.

3. An electrical condenser comprising two dielectrics and a metal coating, so thin that it burns away in the neighborhood of a puncture, applied to each dielectric, each coating providing a plurality of metal coated portions separated by uncoated portions and forming a plurality of condenser plates, a coated portion to provide each dielectric with a current connection strip along one edge, and coated portions forming a plurality of resistance strips connecting said plates in parallel to said current connection strip and an uncoated portion along the opposite edge of said dielectric, said dielectrics being superposed so that the uncovered edge of one dielectric is opposite the resistance strips of the other dielectric.

4. An electrical condenser, comprising a dielectric, a metal coating thereon comprising a plurality of separated portions, said coating being so thin that it burns away in the neighbourhood of a puncture, a thin metal coating providing a current connection carried on one face of the dielectric, and thin metal coatings providing electrical resistances carried on one face of said dielectric for interconnecting said separated portions in parallel to said current connection.

5. An electrical condenser comprising a wound dielectric, a plurality of separated metal coatings thereon which are so thin that they burn away in the neighbourhood of a puncture, a thin metal coating providing a current connection carried on one face of said dielectric, and thin metal coatings providing electrical resistances carried on one face of said dielectric and connecting said separated coatings in parallel to said current connection.

6. An electrical condenser comprising a wound dielectric and a plurality of separated metal coatings thereon forming a winding, which coatings are so thin that they burn away in the neighbourhood of a puncture, a thin metal coating providing a current connection carried on one face of said dielectric, and thin metal coatings providing resistances forming part of said winding and connecting said separated metal coatings in parallel to said current connection.

7. An electrical condenser comprising a dielectric, thinly metallised to form a plurality of separated metal coatings, a thin metal coating providing a current connection applied to said dielectric and thin metal coatings providing resistances applied to one face of said dielectric for connecting said separated coatings in parallel to said current connection, and then wound so as to form a condenser.

8. An electrical condenser, comprising two dielectrics, each thinly metallised, to form a plurality of separate metal coatings which are so thin that they burn away in the neighbourhood of a puncture, a thin metal coating providing a current connection formed on each dielectric for each plurality of metal coatings, and thin metal coatings providing resistances formed on each dielectric and connecting in parallel the separate coatings in each plurality to their respective current connection, said dielectrics being placed side by side and wound to form a condenser.

9. An electrical condenser, comprising two dielectrics, each thinly metallised to form a plurality of separate metallic coatings which are so thin that they burn away in the neighbourhood of a puncture, a thin metal coating providing a current connection applied on each dielectric for each plurality of metal coatings, and thin metal coatings providing resistances, in the form of narrow metal strips applied on each dielectric but separated laterally by narrow metal-free parts from the actual condenser coatings, connecting in parallel the condenser coatings in each plurality to their respective current connection, said dielectrics being placed side by side and wound to form a condenser.

10. An electrical condenser, comprising two dielectrics, each thinly metallised to form a plurality of metallic coatings which are so thin that they burn away in the neighbourhood of a puncture, a current connection applied on each dielectric for each plurality of metal coatings and resistances, situated in a region of the condenser relatively free from field, in the form of narrow metal strips applied to each dielectric but separated laterally by narrow metal-free parts from the actual condenser coatings, connecting in parallel the coatings in each plurality to their respective current connection, said dielectrics being placed side by side and wound to form a condenser with the resistance strips of one dielectric opposite metal-free portions of the other dielectric.

11. An electrical condenser comprising a dielectric thinly metallised to form thereon a metal coating providing a plurality of separate metal surfaces, a current connection formed from said coating, and a plurality of resistances also formed from said coating and connecting the separate metal surfaces in parallel to said current connection.

ALFRED ORTLIEB.
HERMANN STRÄB.